UNITED STATES PATENT OFFICE.

MARK WORSNOP MARSDEN, OF PHILADELPHIA, PENNSYLVANIA.

MATERIAL FOR PACKING.

SPECIFICATION forming part of Letters Patent No. 622,054, dated March 28, 1899.

Application filed July 14, 1897. Serial No. 644,538. (No specimens.)

*To all whom it may concern:*

Be it known that I, MARK WORSNOP MARSDEN, a citizen of the United States, residing at Philadelphia, in the county of Philadelphia, State of Pennsylvania, have invented certain new and useful Improvements in a New Material for Packings and other Purposes, of which the following is a specification.

Raw pith as it is found in its natural state consists of a cellular structure the cells of which either contain sap or dried or partially-dried sap and with which are combined certain adherent matters the precise character of which is not known.

I have discovered that raw pith when compressed has a capacity to absorb many times its volume of liquid, and Letters Patent No. 534,611 were issued to me February 19, 1895, for a leak-protector for vessels, consisting of a filler composed, essentially, of such compressed and comminuted cornstalk-pith. An attempt to make use of it for other purposes showed that in its natural condition it was not suitable therefor. Thus in attempting to nitrate the pith it was found that the sap and other matters contained in the cells and adherent to the natural pith resulted in a violent reaction, increased temperature, partial destruction of the cellular structure, imperfect nitration of the residue, and in the production of chemical compounds which contaminated the product attempted to be made. In some cases the interior portions of the pith were not reached or affected by the acid and where they were it was found difficult or practically impossible to subsequently wholly remove the said acid. Attempts to remove the deleterious materials before referred to by means of washing and drying proved to be ineffective, and such treatment will not result in a substantial change of the characteristics of the raw product. I discovered, however, that it was possible to eliminate these objectionable characteristics and to effect profound chemical changes in the pith and to produce a practically new article therefrom. I have effected this result by first separating the pith from the woody shell or outer fibrous portion of the stalk and then heating and breaking up the pith, in some instances comminuting it until the particles are about the size of grains of rice, and in subjecting the pith during or after this treatment to the action of a blast or current of air, preferably heated. The pith is broken up by percussive action, and the matter which has been deposited within the cells is thereby loosened, so that the subsequent air-blast can readily remove the same, and in practice I submit the pith to repeated heating, beating, and washing with air-blasts until the desired result is secured. The higher the temperature to which the pith is subjected the better, but care must be taken to prevent its ignition. I have found that this treatment of the pith results in causing the solid constituents of the sap to be separated out therefrom in the form of films extending between or coating the cell-walls of the pith, that the comminuting of the pith exposes and opens the said cells, the heat causing the pith to fracture rather than solidify, which is the case when the pith is broken up in a wet state, and that the air-currents tend, further, to dry the liquid constituents of any sap contained in the cells and, further, to expel therefrom the filamentary portions separated from the sappy matters by the heating of the same, and also to remove from association with the cellular structure the other particles of deleterious matters before referred to. Not only are the above-described effects produced, but the chemical characteristics of the remaining structure are greatly changed by the action to which it has been subjected. The product thus produced differs radically and distinguishably both from the raw pith as found in nature and from the said pith compressed as set forth in my prior patent, the compression, however, not resulting in any change in the constituent characteristics of the pith, but simply in bringing it into a different structural condition. Thus the result of said treatment upon the pith is such that whereas when the natural pith is treated with mixed acids necessary for nitration it gives a violent reaction, increased temperature, partial destruction of the pith, imperfect nitration, and the formation of indefinite and undesirable chemical compounds, which contaminate the product intended to be made, the new article may be treated with said acids without fear of increased temperature or burning of the product, and after treatment the whole of the acids may be perfectly eliminated by washing, the product being a dried neutral nitrate of extremely uniform character. The natural pith, compressed or not, when so treated is very apt to be attacked by the acid only at the exterior portions, and it is extremely difficult to wash the same wholly free from acids, which, if they remain, produce gradual decomposition and destruction of the pith, whereas in the new product the acid acts upon the entire cellular structure and, as before stated, can be wholly removed.

In treating the natural pith with reagents, whether compressed or uncompressed, it is found that the same is affected only to a limited degree by the said reagents, which will not come in contact with portions of the pith, and which it is difficult to remove, whereas the improved product may be treated with said reagents and uniformly and regularly converted and every trace of the reagent subsequently removed.

The natural raw pith, compressed or not, cannot be employed effectually in the manufacture of viscose, in which it is essential that every particle of the pith shall come in contact with the reagent. It is also requsite in such process that the pith after treatment with the reagent shall be treated with bisulfid of carbon and that every portion of the pith shall come in contact with the bisulfid to make a complete conversion. This is fully practicable with the new product above described, obtaining a yield of eighty-five per cent.

With the raw or natural pith, whether compressed or not, the alkaline treatment thereof results in reactions similar to those in the reduction of wood-pulp and the product is a more or less watery pulp, partially converted and inert to the action of bisulfid of carbon. These conditions make the raw pith useless as a basis for the production of viscose.

In making the above comparison I have assumed that the natural or raw pith is substantially dried or free from moisture and in that condition in which it would be if removed from the stalk and kept for a considerable length of time in a warm apartment. Further, this new product has different chemical characteristics from those of the dried natural pith, compressed or not. These chemical changes are indicated by the slower reaction changes which take place with reagents and are demonstrated by the fact that the new pith is firmer and tougher than the natural pith and less liable to break in cutting into sections and that the chemical constituents of the new pith and the natural pith, where they exist in each, exist in very different proportions—as, for instance, 7.08 of glucose in the new article and 3.55 in the natural pith; glucose-yielding bodies calculated as starch, 6.37 in the new article and 3.20 in the natural pith, and with nearly four per cent. additional carbon in the new article over that in the old. It is further found that the new article and the natural pith respond very differently to the action of different reagents.

Not only do the above indicated differences exist between the natural pith and the new article, but the characteristics of the natural pith when compressed are secured in a much greater degree than with the new article when compressed.

The only characteristic so far known of natural compressed pith is the capacity to absorb large proportions of liquid, and I have found that if the pith instead of being merely broken up, dried, and compressed (which was all that was comprised in the process of treatment embodied in my former patent) is subjected to the operations above described, so as to produce the novel article referred to, this article, if dried and compressed, will absorb fully thirty-five per cent. more of water under similar conditions.

While I have referred for comparison to the use of the compressed material as absorbing water, it may be used in any case where it is desirable that the material should take up a large body of liquid, and the new material for this purpose is especially desirable in that class of packings which should become saturated with a lubricant or other liquid and by their swelling action pack a joint. As one illustration of the class of packings to which my improvement is applicable I refer to those employed in packing around the tubes of oil-wells, where heretofore it has been common to have a seed-bag containing linseed, the swelling of which is intended to secure a proper joint. The application of the improved material in compressed blocks in a suitable bag, as burlap, in the same manner in which linseed has been employed will result in the immediate swelling of the material in contact with oil or water and in an instant closing of the joints and in a packing of a perfect character which cannot otherwise be obtained. The material is also adapted for that class of packings—such, for instance, as piston-packings—where the packing material is compressed by means of a gland in a box or chamber around a piston-rod or journal. While I have referred to these as instances of the effective application of my improved material, it may be used for many other purposes—for instance, because of its purity and capacity to respond readily to the action of reagents for the manufacture of viscose and because of its purity and its capacity to be thoroughly and uniformly nitrated for use in the manufacture of those substances in which nitrated cellulose must be employed.

I claim as my invention—

The within-described new material adapted for use for packings and other purposes, the same consisting of the comminuted cellular portion of corn-pith freed from sappy deleterious and adherent matters and having the characteristics substantially as set forth.

In testimony whereof I have signed my name to this specification in the presence of two subscribing witnesses.

MARK WORSNOP MARSDEN.

Witnesses:
WALTER WOOLLCOTT,
C. L. S. TINGLEY.